United States Patent
Tiwari et al.

(10) Patent No.: US 9,859,752 B2
(45) Date of Patent: Jan. 2, 2018

(54) UNINTERRUPTIBLE POWER SUPPLY AND METHOD OF USE

(71) Applicant: General Electric Company, Schenectady, NY (US)

(72) Inventors: Arvind Kumar Tiwari, Karnataka (IN); Yashomani Y. Kolhatkar, Karnataka (IN); Silvio Colombi, Losone (CH)

(73) Assignee: General Electric Company, Niskayuna, NY (US)

( * ) Notice: Subject to any disclaimer, the term of this patent is extended or adjusted under 35 U.S.C. 154(b) by 271 days.

(21) Appl. No.: 14/732,215

(22) Filed: Jun. 5, 2015

(65) Prior Publication Data

US 2016/0359361 A1 Dec. 8, 2016

(51) Int. Cl.
*H02J 9/06* (2006.01)
*H02J 9/08* (2006.01)
(Continued)

(52) U.S. Cl.
CPC ............... *H02J 9/066* (2013.01); *H02J 9/04* (2013.01); *H02J 9/08* (2013.01); *H02J 11/00* (2013.01)

(58) Field of Classification Search
CPC ............... H02J 9/066; H02J 11/00; H02J 9/08
(Continued)

(56) References Cited

U.S. PATENT DOCUMENTS 5,473,528 A 12/1995 Hirata et al.
5,745,356 A 4/1998 Tassitino, Jr. et al.
(Continued)

FOREIGN PATENT DOCUMENTS

CN 202444318 U 9/2002
CN 20233383 U 7/2012
(Continued)

OTHER PUBLICATIONS

Byun Y.B., et al., "Parallel Operation of Three-Phase UPS Inverters by Wireless Load Sharing Control", Twenty-second International Telecommunications Energy Conference, Sep. 10-14, 2000, IEEE, pp. 526-532.
(Continued)

*Primary Examiner* — Jared Fureman
*Assistant Examiner* — Win Htun
(74) *Attorney, Agent, or Firm* — Pabitra K. Chakrabarti (57) ABSTRACT

An uninterruptible power supply (UPS) includes a line terminal, a load terminal, a double-conversion circuit coupled in series, and further includes a bypass circuit, and a synchronize circuit. The line terminal couples to a doubly fed induction generator (DFIG). The load terminal couples to a load having a demanded power. The double-conversion circuit regulates grid power from the line terminal to the demanded power at the load terminal. The bypass circuit is coupled between the line terminal and the load terminal, and configured to deliver regulated power generated by the DFIG to the load terminal when the grid power is lost. The synchronize circuit is coupled between the double-conversion circuit and the DFIG, and, when the grid power is lost, the synchronize circuit injects a current through the double-conversion circuit and into the DFIG, synchronizing the regulated power generated by the DFIG to the demanded power.

20 Claims, 3 Drawing Sheets

(51) Int. Cl.
*H02J 9/04* (2006.01)
*H02J 11/00* (2006.01)

(58) Field of Classification Search
USPC .......................................................... 307/67
See application file for complete search history.

(56) References Cited

U.S. PATENT DOCUMENTS

| | | | |
|---|---|---|---|
| 6,121,695 | A | 9/2000 | Loh |
| 6,191,500 | B1 | 2/2001 | Toy |
| 6,803,679 | B1 | 10/2004 | Luo et al. |
| 7,400,066 | B2 | 7/2008 | Tassitino, Jr. et al. |
| 7,425,779 | B2 | 9/2008 | Luo et al. |
| 7,446,433 | B2 | 11/2008 | Masciarelli et al. |
| 7,456,520 | B2 | 11/2008 | Colombi et al. |
| 7,459,803 | B2 | 12/2008 | Mosman |
| 7,566,988 | B2 | 7/2009 | Heber et al. |
| 7,615,890 | B2 | 11/2009 | Masciarelli et al. |
| 7,638,899 | B2 | 12/2009 | Tracy et al. |
| 7,649,758 | B2 | 1/2010 | Taimela et al. |
| 7,667,351 | B2 | 2/2010 | Marwali et al. |
| 7,701,087 | B2 | 4/2010 | Eckroad et al. |
| 7,825,541 | B2 | 11/2010 | Herbener et al. |
| 7,980,905 | B2 | 7/2011 | Rembach et al. |
| 8,022,572 | B2 | 9/2011 | Vyas et al. |
| 8,035,250 | B2 | 10/2011 | Caudill |
| 8,062,081 | B2 | 11/2011 | Barrett et al. |
| 8,148,846 | B2 | 4/2012 | Masciarelli et al. |
| 8,552,589 | B2 | 10/2013 | Ghosh et al. |
| 8,604,640 | B2 | 12/2013 | Masciarelli et al. |
| 8,786,262 | B2 | 7/2014 | Rajashekara et al. |
| 2004/0084965 | A1 | 5/2004 | Welches et al. |
| 2005/0052085 | A1 | 3/2005 | Chang et al. |
| 2006/0006741 | A1 | 1/2006 | Tassitino, Jr. et al. |
| 2006/0113800 | A1 | 6/2006 | Willisch et al. |
| 2006/0167569 | A1 | 7/2006 | Colombi et al. |
| 2007/0007825 | A1 | 1/2007 | Heber et al. |
| 2007/0063677 | A1 | 3/2007 | Schauder |
| 2009/0009001 | A1 | 1/2009 | Marwali et al. |
| 2009/0009005 | A1 | 1/2009 | Luo et al. |
| 2009/0273192 | A1 | 11/2009 | Guven et al. |
| 2009/0278352 | A1 | 11/2009 | Rivas et al. |
| 2010/0002475 | A1 | 1/2010 | Foils et al. |
| 2010/0096853 | A1 | 4/2010 | Woldmann et al. |
| 2011/0106325 | A1 | 5/2011 | Opina, Jr. et al. |
| 2011/0278932 | A1 | 11/2011 | Navarro et al. |
| 2011/0278934 | A1 | 11/2011 | Ghosh et al. |
| 2011/0309677 | A1 | 12/2011 | Bourgeau |
| 2012/0001479 | A1 | 1/2012 | Harpin et al. |
| 2012/0068541 | A1 | 3/2012 | Anderson |
| 2012/0262129 | A1* | 10/2012 | Lu ............................. H02P 9/10 322/28 |
| 2013/0002014 | A1 | 1/2013 | Moore et al. |
| 2013/0069432 | A1 | 3/2013 | Beg et al. |
| 2013/0069434 | A1 | 3/2013 | Beg et al. |
| 2013/0193760 | A1 | 8/2013 | Colombi et al. |
| 2014/0097690 | A1* | 4/2014 | Costa ........................ H02J 9/00 307/64 |
| 2014/0139016 | A1 | 5/2014 | Lovercheck et al. |
| 2015/0349687 | A1 | 12/2015 | Liang et al. |
| 2016/0172900 | A1* | 6/2016 | Welch, Jr. ............. H05K 7/1492 307/64 |

FOREIGN PATENT DOCUMENTS

| | | |
|---|---|---|
| CN | 202333831 U | 7/2012 |
| CN | 202889279 U | 4/2013 |
| CN | 103560576 A | 2/2014 |
| DE | 10 2008 024 222 A1 | 2/2009 |
| DE | 102009017244 A1 | 10/2010 |
| EP | 1 006 641 A2 | 6/2000 |
| EP | 1919055 A2 | 5/2008 |
| EP | 2 101 392 A2 | 9/2009 |
| EP | 2587609 A1 * | 5/2013 ............ H02J 3/381 |
| EP | 2 608 355 A2 | 6/2013 |
| JP | 2005-33890 A | 2/2005 |
| KR | 10-1267513 B1 | 5/2013 |
| WO | 2004025823 A1 | 3/2004 |
| WO | 2013/123546 A1 | 8/2013 |
| WO | 2013/142561 A1 | 9/2013 |

OTHER PUBLICATIONS

Guerrero J.M., et al., "A high-performance DSP-controller for parallel operation of online UPS systems," Nineteenth Annual IEEE Applied Power Electronics Conference and Exposition, APEC' 04, Feb. 22-26, 2004, pp. 463-469.
Johnson B.K. and Lasseter R., "An Industrial Power Distribution System Featuring UPS Properties," 24th Annual IEEE Power Electronics Specialists Conference, PESC'93 Record, Jun. 20-24, 1993, pp. 759-765.
Liu X. et al., "A Hybrid AC/DC Microgrid and Its Coordination Control," IEEE Transactions on Smart Grid, vol. 2, Issue 2, Jun. 2011, pp. 278-286.
Mosman M., "An Isolated-Parallel UPS System for a Large Data Center," The Magazine of 7x24 Exchange International, Newslink, 2007, pp. 6-8.
Noworolski Z., "Parallel UPS Control and Configuration," Third International Telecommunications Energy Conference, INTELEC—London, England, May 19-21, 1981, pp. 205-209.
Sato E.K. and Kawamura A., "High Reliability and High Performance Parallel-Connected UPS System with Independent Control," Twenty-Seventh International Telecommunications Conference, Sep. 18-22, 2005, pp. 389-394.
Xing Y. et al., "Novel control for redundant parallel UPSs with instantaneous current sharing," Proceedings of the Power Conversion Conference, 2002, PCC—Osaka 2002, Abstract, vol. 3, Apr. 2-4, 2002, pp. 959-963.
Yao et al.,"Development of Communicationless Hot-Swap Paralleling for Single-Phase UPS Inverters Based on Adaptive Droop Method," Applied Power Electronics Conference and Exposition, Feb. 15, 2009, pp. 1283-1287.
Zhongyi H. and Xing Y., "Distributed Control for UPS Modules in Parallel Operation With RMS Voltage Regulation," IEEE Transactions on Industrial Electronics, vol. 55, No. 8, Feb. 22, 2008, pp. 2860-2869.
Zhou Y., et al., "Grid-connected and islanded operation of a hybrid power system," Power Engineering Society Conference and Exposition in Africa, 2007, PowerAfrica '07, IEEE, Jul. 16-20, 2007, pp. 1-6.
Extended European Search Report and Opinion issued in connection with related EP Application No. 15155175.1 dated Jun. 23, 2015.
Extended European Search Report and Opinion issued in connection with related EP Application No. 15157301.1 dated Aug. 14, 2015.
Extended European Search Report and Opinion issued in connection with related EP Application No. 15157305.2 dated Sep. 28, 2015.
Non-Final Rejection towards related U.S. Appl. No. 14/186,159 dated Sep. 23, 2016.
Extended European Search Report and Opinion issued in connection with corresponding EP Application No. 16170543.9 dated Oct. 24, 2016.
U.S. Appl. No. 14/306,641, filed Jun. 17, 2014, Kolhatkar et al.
U.S. Appl. No. 14/306,791, filed Jun. 17, 2014, Kolhatkar et al.
U.S. Appl. No. 14/186,159, filed Feb. 21, 2014, Kolhatkar et al.
U.S. Appl. No. 14/725,949, filed May 29, 2015, Tiwari et al.
European Search Report and Written Opinion issued in connection with Application No. 16172123.8 dated Nov. 4, 2016.
G. Iwanski et al.; "DFIG-Based Power Generation System with UPS Function for Variable-Speed Applications"; Industrial Electronics, IEEE Transactions on IEEE Xplore; Aug. 2008, vol. 55, Issue 8, pp. 3047-3054.
T. Waris et al.; "Variable Speed Constant Frequency Diesel Power Conversion System using Doubly Fed Induction Generator (56) References Cited

OTHER PUBLICATIONS (DFIG)"; Power Electronics Specialists Conference, 2008, PESC 2008, IEEE, IEEE Xplore; pp. 2728-2734, Jun. 15-19, 2008.

Chandorkar, M.G. et al., "Control of parallel connected inverters in standalone AC supply systems," IEEE Transactions on Industry Applications, vol. 29, Issue 1, pp. 136-143 (Jan./Feb. 1993).

Duan, S. et al., "Parallel operation control technique of voltage source inverters in UPS," Proceedings of the IEEE International Conference on Power Electronics and Drive Systems, PEDS'99, vol. 2, pp. 883-887 (1999).

Guerrero, J.M. et al., "Control of line-interactive UPS connected in parallel forming a microgrid," IEEE International Symposium on Industrial Electronics, pp. 2667-2672 (2007).

Holtz, J. and Werner, K-H., "Multi-inverter UPS system with redundant load sharing control," IEEE Transactions on Industrial Electronics, vol. 37, Issue 6, pp. 506-513 (1990).

"TMS320F240 DSP Controller (Rev. E)," Datasheet, Texas Instruments Incorporated, pp. 1-104 (Nov. 2002).

"TMS320C6711, TMS320C6711B, TMS320C6711C, Floating-Point Digital Signal Processors," Datasheet, Texas Instruments Incorporated, pp. 1-132 (Nov. 2005).

"TMS320LF2407A, TMS320LF2406A, TMS320LF2403A, TMS320LF2402A, TMS320LC2406A, TMS320LC2404A, TMS320LC2403A, TMS320LC2402A DSP Controllers," Datasheet, Texas Instruments Incorporated, pp. 1-134 (Sep. 2007).

Non Final Rejection towards related U.S. Appl. No. 14/306,641 dated Jan. 23, 2017.

Non Final Rejection towards related U.S. Appl. No. 14/306,791 dated Jan. 25, 2017.

Non Final Rejection towards related U.S. Appl. No. 14/725,949 dated May 1, 2017.

\* cited by examiner

UNINTERRUPTIBLE POWER SUPPLY AND METHOD OF USE

BACKGROUND

The field of the disclosure relates generally to electrical distribution systems and, more particularly, to an uninterruptible power supply and a method of use thereof.

Many known electrical distribution systems are served by a local utility's electric grid. These distribution systems, when described in terms of their electrical loads, deliver power to components considered critical and others considered non-critical. Non-critical loads can typically handle brief power interruptions of several seconds or more, whereas critical loads cannot. Many known electrical distribution systems utilize a back-up energy source to ensure service to at least the critical loads is maintained in the event power from the grid is lost. Back-up energy sources include, for example, and without limitation, generators, energy storage devices, and renewable sources, such as wind, hydro, and solar systems, for example. A back-up energy source connects to a load through a transfer switch, which is either automatic or manual. During normal operation, under grid power, the transfer switch generally isolates the back-up energy source from the load. The transfer switch connects the back-up energy source to the load when grid power is lost. Automatic transfer switches facilitate this connection and disconnection automatically.

Many known electrical distribution systems also utilize an uninterruptible power supply (UPS) to ensure power to critical loads is not lost. UPS systems facilitate continuous service to critical loads while under grid power, back-up power, and while transitioning there between. In electrical distribution systems using a generator, for example, as the back-up power source, the UPS regulates the power delivered to the critical loads. Such a generator typically has a capacity two or three times higher than the UPS capacity to compensate for irregularities in the power generated by the generator, which may occur, for example, and without limitation, when the load changes. Consequently, conversion losses are incurred within the UPS during conversion of the generated power, and the generator itself generally has misallocated capacity. Additional losses are also incurred during startup of the generator.

BRIEF DESCRIPTION

In one aspect, an uninterruptible power supply (UPS) includes a line terminal, a load terminal, a double-conversion circuit coupled in series, and further includes a bypass circuit, and a synchronize circuit. The line terminal couples to a doubly fed induction generator (DFIG). The load terminal couples to a load having a demanded power. The double-conversion circuit regulates grid power from the line terminal to the demanded power at the load terminal. The bypass circuit is coupled between the line terminal and the load terminal, and configured to deliver regulated power generated by the DFIG to the load terminal when the grid power is lost. The synchronize circuit is coupled between the double-conversion circuit and the DFIG, and, when the grid power is lost, the synchronize circuit injects a current through the double-conversion circuit and into the DFIG, synchronizing the regulated power generated by the DFIG to the demanded power.

In another aspect, a method of operating an electrical distribution system includes detecting a loss of grid power on a line terminal. The method further includes disconnecting a double-conversion circuit from the line terminal. The method further includes starting-up a doubly fed induction generator (DFIG), generating regulated power. The method further includes delivering the regulated power to a load, bypassing the double-conversion circuit. The method further includes feeding back the regulated power, through the double-conversion circuit, to the DFIG, synchronizing the regulated power to a desired frequency, phase, and amplitude for the load.

In yet another aspect, an electrical distribution system includes a doubly fed induction generator (DFIG), an automatic transfer switch, and an uninterruptible power supply (UPS). The DFIG includes a rotor and a stator. The DFIG is configured to generate a regulated power at the stator. The automatic transfer switch is configured to decouple from a grid and couple to the stator upon detection of a loss of grid power. The UPS is configured to receive a regulated power through the automatic transfer switch from the DFIG. The UPS is further configured to deliver a first portion of the regulated power to a load. The UPS is further configured to deliver a second portion of the regulated power to the rotor to synchronize the regulated power to a desired frequency, phase, and amplitude for the load.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to electrical distribution systems for critical and non-critical loads. The electrical distribution systems described herein provide efficient transition from grid to back-up power and continued efficient service of back-up power. More specifically, use of a doubly fed induction generator (DFIG) facilitates improved load-matched power generation, which improves overall efficiency of the back-up system, and, in combination with an uninterruptible power supply (UPS), facilitates a more efficient startup of back-up generators. Further losses within the UPS are mitigated by improved regulation of the power generated by the DFIG.

Figure 1:
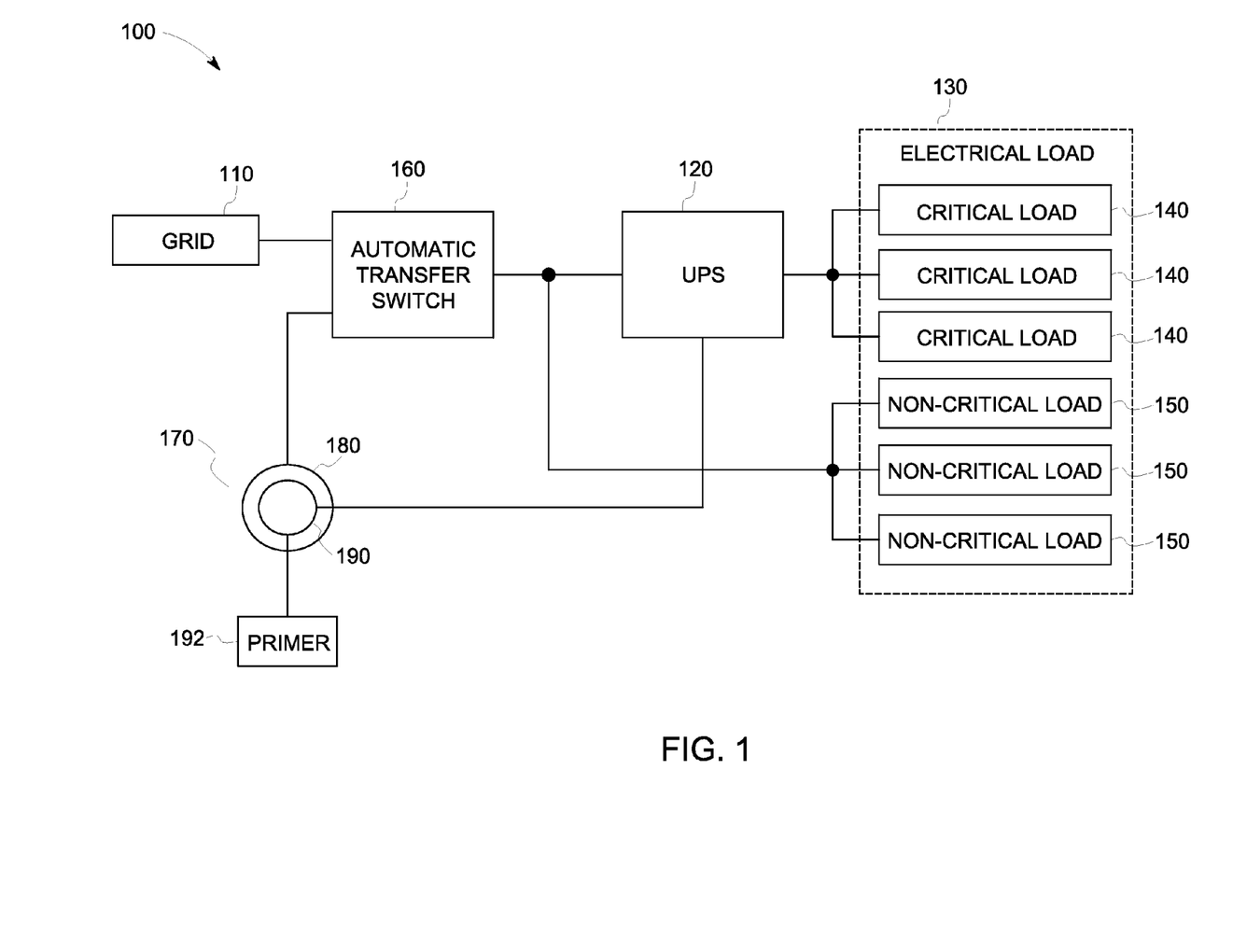
FIG. 1 is a block diagram of an exemplary electrical distribution system.

FIG. 1 is a block diagram of an exemplary electrical distribution system 100. Electrical distribution system 100 includes a grid 110 and a UPS 120 for serving an electrical load 130 under normal operating conditions. Electrical load 130 includes critical loads 140 and non-critical loads 150. Critical loads 140 are served by UPS 120 to ensure power in the event power from grid 110 is lost. Grid 110 connects to UPS 120 and electrical load 130 through an automatic transfer switch 160, as does a DFIG 170, which serves as a back-up energy source.

During normal operating conditions, grid 110 serves electrical load 130 and automatic transfer switch 160 disconnects DFIG 170. Power is delivered to critical loads 140 through UPS 120, which carries out alternating current (AC)-to-direct current (DC), DC-to-AC, and DC-to-DC conversions to condition the power for critical loads 140 and other loads internal to UPS 120, such as, for example and without limitation, a battery (not shown). Power is delivered to non-critical loads 150 directly, bypassing UPS 120.

When grid 110 is lost, automatic transfer switch 160 and UPS 120 communicate to coordinate transition from grid power, sourced by grid 110, to back-up generator power, sourced by DFIG 170. Automatic transfer switch 160 disconnects grid 110 and connects DFIG 170 to UPS 120. More specifically, automatic transfer switch 160 connects a stator 180 of DFIG 170 to UPS 120. During the transition, UPS 120 serves critical loads 140 by an internal energy storage device (not shown), such as, for example and without limitation, a battery. UPS 120 also energizes a rotor 190 of DFIG 170, injecting a desired frequency and amplitude of current, as a primer 192 turns rotor 190. UPS 120 controls the excitation of rotor 190 to deliver a desired regulated voltage that is generated at stator 180 having a phase, frequency, and magnitude suitable for the load. The regulated power is then delivered to critical loads 140 through automatic transfer switch 160 and UPS 120, and to non-critical loads 150 through automatic transfer switch 160, bypassing UPS 120.

Primer 192 is driven, for example and without limitation, a variable speed drive (not shown), such as an engine, for example, that runs on diesel, gasoline, natural gas, or any other suitable fuel. The variable speed drive facilitates operating DFIG 170 at sub-synchronous speeds to optimize efficiency of the DFIG 170 and the variable speed drive, while also generating the regulated voltage at the desired phase and frequency. During operation, DFIG 170 consumes energy at rotor 190, although energy consumed is generally a fraction of energy generated at stator 180. The ratio of energy consumed at rotor 190 to energy generated at stator 180 varies with the speed of primer 192.

In certain embodiments, during transition from grid power to back-up generator power, UPS 120 energizes stator 180, rather than rotor 190, of DFIG 170, which then operates as an induction motor and cranks rotor 190 and primer 192. Once rotor 190 and primer 192 are at or near speed, UPS 120 energizes rotor 190 to synchronize the frequency, phase, and magnitude of the generated power. UPS 120 then stops energizing stator 180, and primer 192, then under power, turns rotor 190. Cranking power supplied by UPS 120 to DFIG 170 is generally more efficient at bringing primer 192 to speed than cranking power supplied by the variable speed drive or other suitable drive for primer 192.

Figure 2:
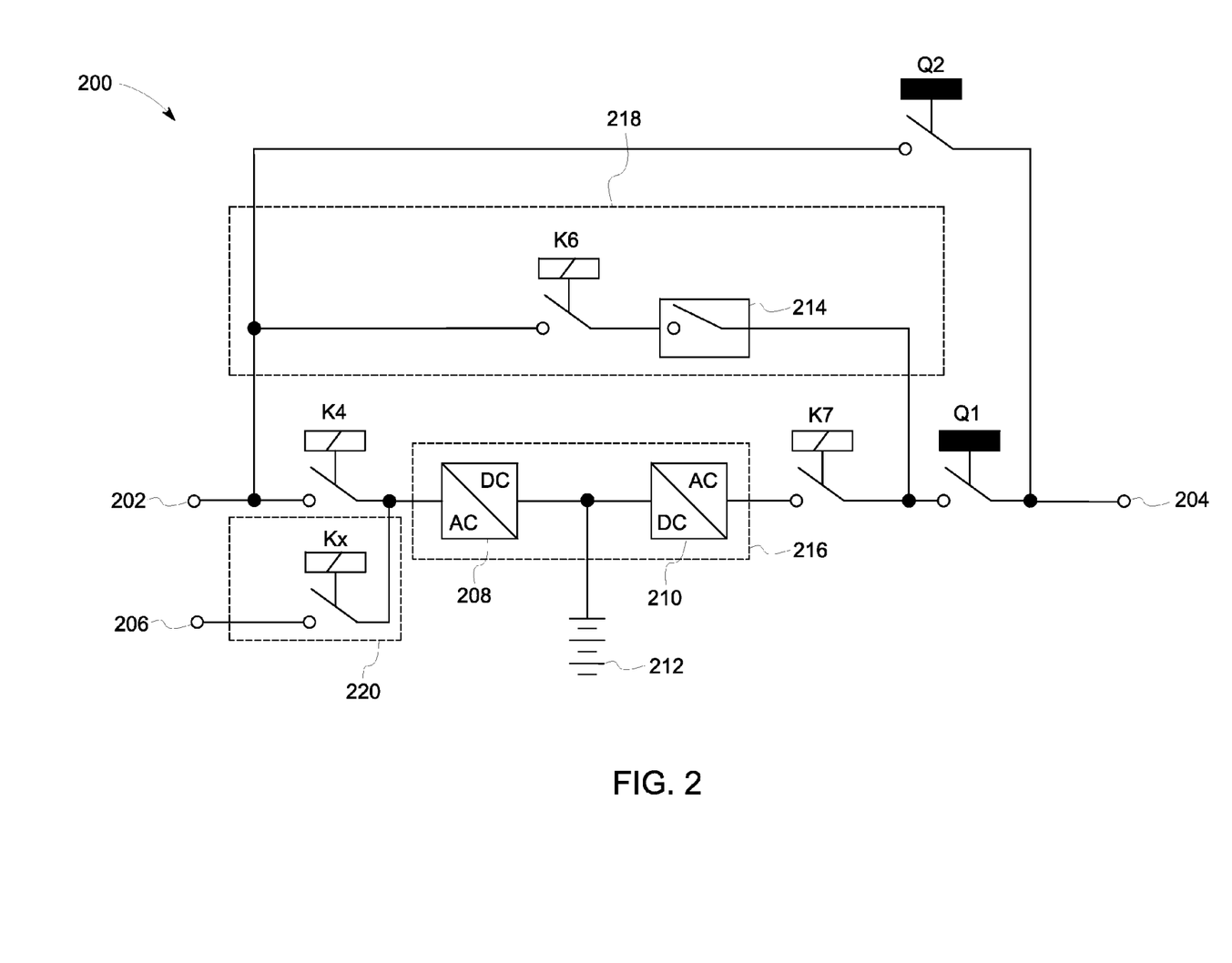
FIG. 2 is a schematic diagram of an exemplary uninterruptible power supply (UPS) for use in the electrical distribution system shown in FIG. 1.

FIG. 2 is a schematic diagram of an exemplary UPS 200 for use in electrical distribution system 100 (shown in FIG. 1). Now referring to FIGS. 1 and 2, UPS 200 includes a line terminal 202, a load terminal 204, and a synchronize terminal 206. Line terminal 202 is couplable to a power source (not shown), such as grid 110 and DFIG 170 through automatic transfer switch 160. Load terminal 204 is couplable to an electrical load, such as electrical load 130 and, more specifically, at least one of critical loads 140. Synchronize terminal 206 is couplable to a rotor of a DFIG, such as rotor 190 of DFIG 170 for injecting a desired frequency and amplitude of current.

UPS 200 further includes AC/DC converter 208, DC/AC converter 210, battery 212, thyristor 214, and switches K4, K6, K7, Kx, Q1, and Q2. AC/DC converter 208 and DC/AC converter 210 form a double-conversion circuit 216 serially coupled with switches K4, K7, and Q1, and further coupled between line terminal 202 and load terminal 204. Switch K6 and thyristor 214 form a bypass circuit 218 coupled in parallel to double-conversion circuit 216. Switch Q2 facilitates an alternate bypass of double-conversion circuit 216 and bypass circuit 218. Switch K7 facilitates disconnecting AC/DC converter 208, batter 212, and DC/AC converter 210 when bypass circuit 218 is closed or when the alternate bypass through switch Q2 is closed. Switch Q1 facilitates a complete disconnect from load terminal 204. Switch Kx is coupled between synchronize terminal 206 and AC/DC converter 208, forming a synchronize circuit 220.

During normal operation, under grid power, AC power is supplied to line terminal 202. Switches K4, K7, and Q1 are closed, delivering power to load terminal 204 through AC/DC converter 208 and DC/AC converter 210, which is referred to as double conversion operation. This double conversion is one source of loss within UPS 200. Battery 212 is also charged by the DC link between AC/DC converter 208 and DC/AC converter 210. Switches K6 and Q2 are open, preventing bypass of AC/DC converter 208 and DC/AC converter 210. Switch Kx is also open, preventing UPS 200 from energizing rotor 190.

When grid power is lost, automatic transfer switch 160 disconnects grid 110 and connects stator 180 of DFIG 170 to line terminal 202. Additionally, switch K4 opens, disconnecting AC/DC converter 208 from line terminal 202 and beginning a transition from grid power to back-up generator power, which is sourced by DFIG 170. During the transition, battery 212 supplies power to load terminal 204 through DC/AC converter 210 and switches K7 and Q1, which remain closed. Switch Kx closes, drawing energy from battery 212 through AC/DC converter 208, which operates as an inverter to energize rotor 190 of DFIG 170 through synchronize terminal 206. Rotor 190 turns and generates power at stator 180 of DFIG 170. The generated power is supplied to line terminal 202.

When rotor 190 is at speed and synchronized to the desired frequency, phase, and magnitude, the transition is complete and switch K6 and thyristor 214 are closed. The generated power is delivered to load terminal 204 through switch K6, thyristor 214, and switch Q1, bypassing AC/DC converter 208 and DC/AC converter 210. Switch K7 remains closed to facilitate charging of battery 212 through DC/AC converter 210, which is operating as a rectifier, and to energize rotor 190 through DC/AC converter 210, AC/DC converter 208, switch Kx, and synchronize terminal 206.

In certain embodiments, during transition from grid power to back-up generator power, UPS 200 provides cranking power to DFIG 170 to make startup for DFIG 170 more efficient. Switches K7 and Q1 are closed, delivering power from battery 212 to load terminal 204 through DC/AC converter 210. While providing cranking power, switches K4 and Kx are open, disconnecting AC/DC converter 208 from line terminal 202 and rotor 190. Thyristor 214 and switch K6 are closed, directing power from battery 212 to stator 180 of DFIG 170. Stator 180, then energized, cranks rotor 190 and primer 192 to bring rotor 190 up to or near speed. Switch Kx is then closed, energizing rotor 190 and synchronizing the frequency, phase, and magnitude of power generated at stator 180. Switch K6 is then opened to transition cranking power from UPS 200 to primer 192, which is turned by a variable speed drive or other suitable drive. Once the regulated voltage generated at stator 180 is synchronized, switch K6 is re-closed and UPS 200 transitions from battery 212 to DFIG 170.

Figure 3:
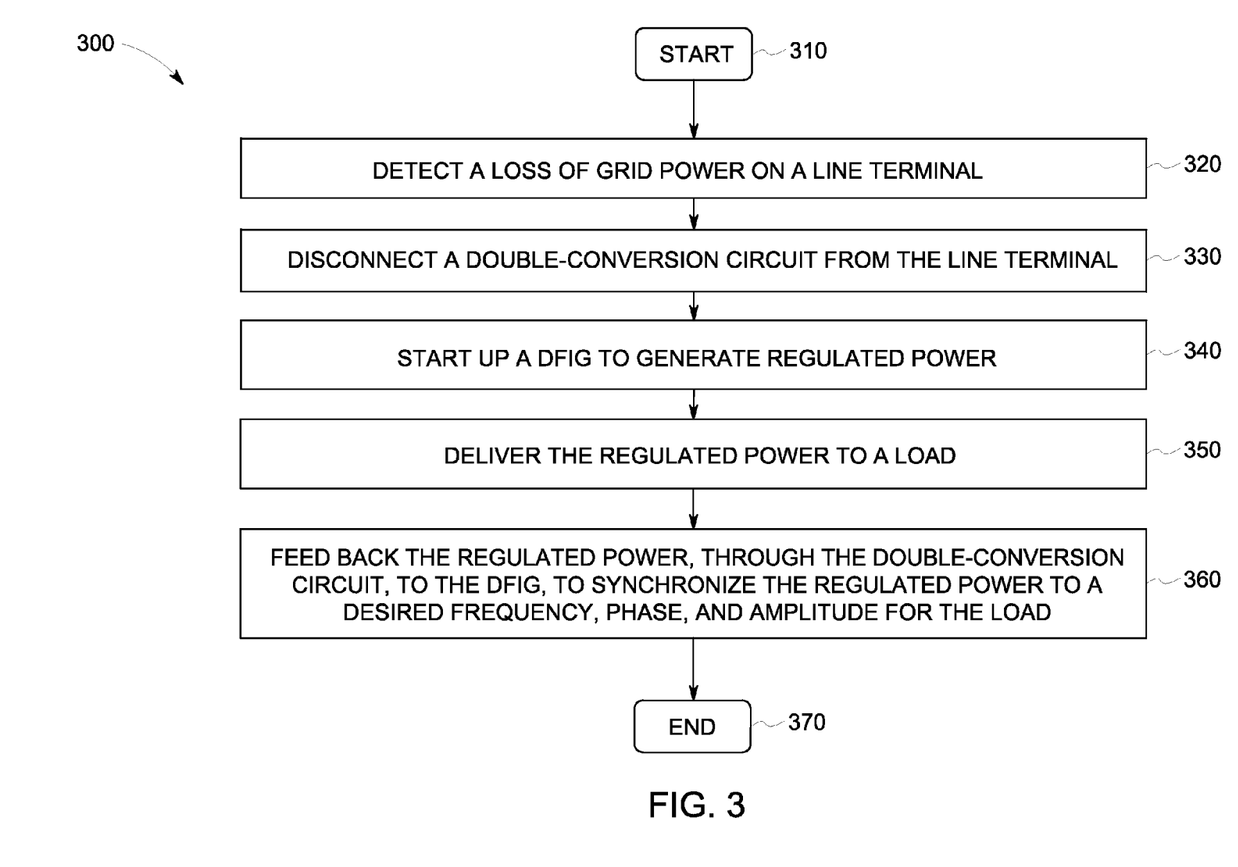
FIG. 3 is flow diagram of an exemplary method of operating the electrical distribution system shown in FIG. 1.

FIG. 3 is a flow diagram of an exemplary method 300 of operating electrical distribution system 100 (shown in FIG. 1). Now referring to FIGS. 1, 2, and 3, the method begins at a start step 310. At a detection step 320, a loss of grid power, sourced by grid 110, is detected. Then, at a disconnect step 330, a switch K4 disconnects double-conversion circuit 216 from line terminal 202. During this transition, power is supplied to load terminal 204 by battery 212 through DC/AC converter 210 and switches K7 and Q1.

At a DFIG startup step 340, DFIG 170 is started to generate regulated power. DFIG 170 is started by turning rotor 190, which is attached to primer 192. Primer 192 is driven by a variable speed drive, such as, for example and without limitation, an engine. In certain embodiments, during DFIG startup step 340, battery 212 provides a cranking power through bypass circuit 218 to stator 180 of DFIG 170. In those embodiments, switch Kx remains open during startup, facilitating the cranking of rotor 190 by induction. When rotor 190 reaches a desired speed, switch Kx is closed to apply the battery power to rotor 190, which synchronizes the power generated by DFIG 170 to the desired frequency, phase, and amplitude for electrical load 130. Once rotor 190 is at the desired speed and DFIG 170 is synchronized, cranking power from battery 212 is removed by opening switch K6. The desired speed at which rotor 190 is energized to begin synchronizing DFIG 170 varies per embodiment. Certain DFIG and variable speed drive combinations will have different handover points than others, according to the efficiencies gained by cranking rotor 190 by induction versus by primer 192.

At a back-up power delivery step 350, a first portion of the regulated power generated by DFIG 170 is delivered to critical loads 140 through bypass circuit 218 and switch Q1. Further, a second portion of the regulated power is fed back, at a synchronize step 360, to rotor 190 of DFIG 170 through bypass circuit 218, back through double-conversion circuit 216, and through switch Kx. The regulated power fed back to rotor 190 synchronizes the regulated power generated by DFIG 170 to the desired frequency, phase, and amplitude for electrical load 130. The method then ends at an end step 370.

The above described electrical distribution systems provide efficient transition from grid to back-up power and continued efficient service of back-up power for critical and non-critical loads. More specifically, use of a DFIG facilitates improved load-matched power generation, which improves overall efficiency of the back-up system, and, in combination with an UPS, facilitates a more efficient startup of the back-up generator, which is the DFIG. Further losses within the UPS are mitigated by improved regulation of the power generated by the DFIG.

An exemplary technical effect of the methods, systems, and apparatus described herein includes at least one of: (a) improved matching of load and generated power through use of DFIGs and variable speed drives; (b) improved regulation of power generated by DFIGs, which permits bypass of UPS converters; (c) reduced losses in the UPS resulting from at least a partial bypass of the double conversion; (d) more efficient startup of DFIG generators when combined with the UPS; (e) reduced capital expenditures for over-capacity; and (f) reduced operational costs resulting from general efficiencies gained, for example, reduced fuel cost by operating a DFIG at a variable speed corresponding to the various demand of the load.

Exemplary embodiments of methods, systems, and apparatus for electrical distribution systems are not limited to the specific embodiments described herein, but rather, components of systems and/or steps of the methods may be utilized independently and separately from other components and/or steps described herein. For example, the methods may also be used in combination with other non-conventional electrical distribution systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. An uninterruptible power supply (UPS) comprising:
a line terminal configured to be coupled to a doubly fed induction generator (DFIG) and an electric grid, the electric grid configured to transmit grid power to the line terminal, the DFIG configured to generate regulated power;
a load terminal configured to be coupled to a load that has a demanded power;
a double-conversion circuit configured to be coupled to the line terminal and the load terminal, the double- conversion circuit further configured to regulate grid power transmission from the line terminal to the load terminal;

a bypass circuit configured to be coupled to the line terminal and the load terminal, the bypass circuit further configured to deliver the regulated power to the load terminal when the grid power is unavailable; and a synchronize circuit configured to be coupled to the double-conversion circuit and the DFIG, the synchronize circuit further configured to inject a current from the double-conversion circuit into the DFIG when the grid power is unavailable, the current configured to synchronize the regulated power generated by the DFIG to the demanded power.

2. The UPS in accordance with claim 1, wherein the double-conversion circuit comprises:

an alternating current-to-direct current (AC/DC) converter; and a direct current-to-alternating current (DC/AC) converter serially coupled to the AC/DC converter.

3. The UPS in accordance with claim 2, further comprising a battery coupled to the double-conversion circuit, the battery configured to provide the demanded power to the load terminal when transitioning between the grid power and the regulated power.

4. The UPS in accordance with claim 3, wherein the battery is further configured to supply the current injected into the DFIG, the current transmitted through the AC/DC converter and the synchronize circuit.

5. The UPS in accordance with claim 4, further comprising a first switch positioned between the line terminal and the double-conversion circuit, the first switch configured to close when the grid power is present and open when the grid power is not present.

6. The UPS in accordance with claim 5, wherein the bypass circuit comprises a second switch between the line terminal and the load terminal, the second switch configured to open when the grid power is present.

7. The UPS in accordance with claim 6, wherein the second switch is further configured to:

open when the battery provides the demanded power to the load terminal; and close to deliver the regulated power generated by the DFIG to the load terminal.

8. The UPS in accordance with claim 7, wherein the second switch is further configured to close when the battery provides the demanded power, the battery configured to provide cranking power through the second switch to the DFIG.

9. A method of operating an electrical distribution system configured to be coupled to an electric grid and receive grid power therefrom, the method comprising:

detecting a loss of grid power on a line terminal;

disconnecting a double-conversion circuit from the line terminal;

starting-up a doubly fed induction generator (DFIG) and generating regulated power;

delivering the regulated power to a load comprising bypassing the double-conversion circuit; and feeding back the regulated power, through the double-conversion circuit, to the DFIG, thereby synchronizing the regulated power to a desired frequency, phase, and amplitude for the load.

10. The method in accordance with claim 9, further comprising:

delivering battery power to the load when transitioning from the grid power to the regulated power; and feeding back the battery power, through at least a portion of the double-conversion circuit, to the DFIG, thereby synchronizing the regulated power to the desired frequency, phase, and amplitude.

11. The method in accordance with claim 9, wherein starting-up the DFIG comprises:

delivering battery power to a stator of the DFIG comprising bypassing the double-conversion circuit before energizing a rotor of the DFIG;

cranking the rotor and a primer coupled thereto by induction to a desired speed;

applying the battery power to the rotor, through at least a portion of the double-conversion circuit, thereby synchronizing the regulated power generated by the DFIG to the desired frequency, phase, and amplitude;

removing the battery power from the stator; and driving the primer with a variable speed drive.

12. The method in accordance with claim 9, further comprising:

disconnecting, at an automatic transfer switch, the line terminal from a grid that provides the grid power, upon detecting the loss of the grid power; and connecting, at the automatic transfer switch, the line terminal to a stator of the DFIG.

13. The method in accordance with claim 9, further comprising:

regulating the grid power, at the double-conversion circuit, to the desired frequency, phase, and amplitude before detecting the loss of the grid power; and delivering the grid power through the double-conversion circuit to the load before detecting the loss of the grid power.

14. The method in accordance with claim 9, further comprising delivering the regulated power through the double-conversion circuit to a battery, thereby charging the battery.

15. An electrical distribution system comprising:

a doubly fed induction generator (DFIG) comprising a rotor and a stator, the DFIG configured to generate a regulated power at the stator;

an automatic transfer switch configured to decouple from a grid and couple to the stator upon detection of a loss of grid power;

an uninterruptible power supply (UPS) configured to:

receive a regulated power through the automatic transfer switch from the DFIG;

deliver a first portion of the regulated power to a load; and deliver a second portion of the regulated power to the rotor to synchronize the regulated power to a desired frequency, phase, and amplitude for the load.

16. The electrical distribution system in accordance with claim 15, wherein the UPS comprises:

a double-conversion circuit configured to:

regulate and deliver the grid power to the load; and regulate and deliver the regulated power, generated by the stator, to the rotor; and a battery coupled to the double-conversion circuit, the double-conversion circuit further configured to deliver a direct current (DC) charging power to the battery.

17. The electrical distribution system in accordance with claim 16, wherein the UPS further comprises a bypass circuit coupled in parallel to the double-conversion circuit, the bypass circuit configured to:

open when the grid power is present; and close when receiving the regulated power from the DFIG.

18. The electrical distribution system in accordance with claim 17, wherein the battery is configured to deliver battery power to the load during a transition between the grid power and the regulated power from the DFIG.

19. The electrical distribution system in accordance with claim 18, wherein the bypass circuit is further configured to close during the transition, the battery further configured to deliver battery power to the stator to crank the rotor by induction.

20. The electrical distribution system in accordance with claim 19, wherein the UPS further comprises a switch coupled between the double-conversion circuit and the rotor of the DFIG, the switch configured to:
- close when delivering the regulated power, generated by the stator, to the rotor;
- open when delivering the battery power to the stator to crank the rotor by induction; and
- close after cranking the rotor to deliver the battery power to the rotor, through the double-conversion circuit, to synchronize the regulated power generated by the DFIG to the desired frequency, phase, and amplitude.

\* \* \* \* \*